United States Patent
Hong et al.

(10) Patent No.: US 9,864,225 B2
(45) Date of Patent: Jan. 9, 2018

(54) LIQUID CRYSTAL DISPLAY

(71) Applicant: SAMSUNG DISPLAY CO., LTD., Yongin, Gyeonggi-do (KR)

(72) Inventors: Ki Pyo Hong, Hwaseong-si (KR); Do Yeong Park, Seoul (KR); Young Goo Song, Asan-si (KR); Sang Woo Whangbo, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 164 days.

(21) Appl. No.: 14/823,291

(22) Filed: Aug. 11, 2015

(65) Prior Publication Data
US 2016/0252771 A1    Sep. 1, 2016

(30) Foreign Application Priority Data
Feb. 27, 2015   (KR) .................. 10-2015-0028564

(51) Int. Cl.
*G02F 1/1339*     (2006.01)
*G02F 1/1335*     (2006.01)
*G02F 1/1341*     (2006.01)
*G02F 1/1333*     (2006.01)

(52) U.S. Cl.
CPC ...... *G02F 1/133512* (2013.01); *G02F 1/1339* (2013.01); *G02F 1/1341* (2013.01); *G02F 1/13394* (2013.01); *G02F 2001/13396* (2013.01); *G02F 2001/133388* (2013.01); *G02F 2201/50* (2013.01)

(58) Field of Classification Search
CPC .......... G02F 1/133512; G02F 1/13394; G02F 1/1339; G02F 2001/13396; G02F 1/1341; G02F 2001/133388; G02F 2201/50

USPC .................. 349/110–111, 153–154
See application file for complete search history.

(56) References Cited

U.S. PATENT DOCUMENTS

| 7,884,900 B2 | 2/2011 | Doi et al. |
| 2007/0229734 A1* | 10/2007 | Ho ..................... G02F 1/13394 |
| | | 349/106 |
| 2007/0291216 A1* | 12/2007 | Chan .................... G02F 1/1339 |
| | | 349/153 |

(Continued)

FOREIGN PATENT DOCUMENTS

| KR | 1020020093984 | 12/2002 |
| KR | 1020130025222 | 3/2013 |
| KR | 1020130080360 | 7/2013 |

*Primary Examiner* — Charles Chang
(74) *Attorney, Agent, or Firm* — F. Chau & Associates, LLC (57) ABSTRACT

A liquid crystal display includes a display area (DA) in which an image is displayed and a peripheral area (PA) disposed in a vicinity of the DA, a first substrate disposed in the PA and a second substrate facing the first substrate, at least one column spacer part disposed on the first substrate, a light blocking member disposed on the first substrate, a liquid crystal layer disposed between the first substrate and the second substrate, and a seal formed at circumferences of the first and second substrates, the seal coupling the first substrate and the second substrate to each other and confining the liquid crystal layer between the first substrate and the second substrate, wherein the light blocking member includes at least one dam formed therein, the at least one dam being disposed in the PA and including at least one opening part formed therein.

19 Claims, 5 Drawing Sheets

(56) References Cited

U.S. PATENT DOCUMENTS

2010/0014043 A1* 1/2010 Ootaguro .............. G02F 1/1339
349/154

* cited by examiner

LIQUID CRYSTAL DISPLAY

CROSS-REFERENCE TO RELATED APPLICATION

This application claims priority under 35 U.S.C. §119 to Korean Patent Application No. 10-2015-0028564, filed on Feb. 27, 2015, in the Korean Intellectual Property Office, the disclosure of which is incorporated by reference herein in its entirety.

TECHNICAL FIELD

The present invention relates to a liquid crystal display.

DISCUSSION OF THE RELATED ART

Flat panel displays may be thin. Examples of widely used flat panel displays may include, liquid crystal displays, organic light emitting displays, electrophoretic displays, electrowetting displays, and the like.

A liquid crystal display may include two display panels, a liquid crystal layer interposed between the two display panels, and a plurality of color filters representing colors. The display panels may include electric field generating electrodes such as pixel electrodes, common electrodes, and the like. Alignment films may be disposed on the display panels. The alignment films may define an initial alignment of liquid crystal molecules of the liquid crystal layer. The electric field generating electrodes may generate an electric field which may change the alignment of the liquid crystal molecules of the liquid crystal layer. In a liquid crystal display, a polarization state of incident light passing through the liquid crystal layer may be changed according to the alignment of the liquid crystal molecules. The change in the polarization of incident light passing through the liquid crystal layer may affect transmittance of light by a polarizer.

A vertically aligned (VA) type of a liquid crystal display may be a liquid crystal display in which long sides of the liquid crystal molecules are arranged vertically with respect to the display panels when an electric field is not applied to the liquid crystal layer. In the VA type of liquid crystal display, the pixel electrodes may be formed (e.g., disposed) on a lower panel and the common electrodes may be formed on an upper panel to generate the electric field on the liquid crystal layer. An inclination angle of the liquid crystal molecules with respect to the display panels may be determined based on a strength of the electric field applied to the liquid crystal layer.

A liquid crystal display may include a light blocking member to prevent light from being leaked or reflected between the pixel electrodes and to increase a contrast ratio. Since the light blocking member is generally formed in a matrix form over an entire surface of a liquid crystal display panel, the light blocking member may also be called a black matrix and may include a light blocking material.

SUMMARY

According to an exemplary embodiment of the present invention, a liquid crystal display may include dams capable of preventing seal unoccupied areas (SUAs).

In an exemplary embodiment of the present invention, a liquid crystal display includes a display area (DA) in which an image is displayed and a peripheral area (PA) disposed in a vicinity of the DA, a first substrate disposed in the PA and a second substrate facing the first substrate, at least one column spacer part disposed on the first substrate, a light blocking member disposed on the first substrate, a liquid crystal layer disposed between the first substrate and the second substrate, and a seal formed at circumferences of the first and second substrates, the seal coupling the first substrate and the second substrate to each other and confining the liquid crystal layer between the first substrate and the second substrate, wherein the light blocking member includes at least one dam formed therein, the at least one dam being positioned in the PA and including at least one opening part formed therein, the at least one opening part serving as an inlet through which liquid crystal of the liquid crystal layer is spread.

According to an exemplary embodiment of the present invention, the light blocking member and the at least one column spacer parts may be formed integrally with each other.

According to an exemplary embodiment of the present invention, the light blocking member includes a plurality of dams, wherein each dam, from among the plurality of dams, includes one or more opening parts formed therein.

According to an exemplary embodiment of the present invention, one or more opening parts formed between neighboring dams, from among the plurality of dams, are misaligned with respect to each other.

According to an exemplary embodiment of the present invention, the one or more opening parts are opened toward a plurality of pixels, wherein the plurality of pixels are disposed in the DA.

According to an exemplary embodiment of the present invention, the at least one dam is formed using a photo resist process.

According to an exemplary embodiment of the present invention, the light blocking member is formed using a full tone mask.

In an exemplary embodiment of the present invention, a liquid crystal display includes a display area (DA) for displaying an image and a peripheral area (PA) disposed in a vicinity of the PA, a first substrate disposed in the PA, and a second substrate disposed opposite to the first substrate, a liquid crystal layer formed between the first and second substrates, a light blocking member disposed on the first substrate, a column spacer part disposed on the first substrate and formed integrally with the light blocking member, and a seal formed at outer perimeters of the first and second substrates, the seal fixing the first and second substrates to each other and sealing the liquid crystal layer between the first and second substrates, wherein the light blocking member includes at least one dam having at least one opening, and wherein a first upper surface of the light blocking member is formed at a first elevation, with respect to the first substrate, on a first portion of the first substrate corresponding to the at least one dam but not corresponding to the at least one opening of the at least one dam, wherein a second upper surface of the light blocking member is formed at a second elevation, with respect to the first substrate, on a second portion of the first substrate corresponding to the at least one opening of the at least one dam, and wherein the first elevation is higher than the second elevation.

According to an exemplary embodiment of the present invention, the light blocking member includes a plurality of dams, wherein each dam, from among the plurality of dams, includes a plurality of openings.

According to an exemplary embodiment of the present invention, a first opening of a first dam, from among the plurality of the dams, is misaligned with respect to a second opening of a second dam, from among the plurality of the dams, wherein the first and second dams are adjacent to each other.

According to an exemplary embodiment of the present invention, the light blocking member is formed using a half tone mask or a full tone mask.

According to an exemplary embodiment of the present invention, the at least one dam is formed using a photo resist process.

According to an exemplary embodiment of the present invention, the seal is transparent or opaque.

According to an exemplary embodiment of the present invention, the seal includes black carbon.

In an exemplary embodiment of the present invention, a liquid crystal display includes a display area (DA) for displaying an image and a peripheral area (PA) disposed in a vicinity of the PA, a first substrate disposed in the PA, and a second substrate disposed opposite to the first substrate, a liquid crystal layer formed between the first and second substrates, a light blocking member disposed on the first substrate, a column spacer part disposed on the first substrate and formed integrally with the light blocking member, and a seal formed at outer perimeters of the first and second substrates, the seal fixing the first and second substrates to each other and sealing the liquid crystal layer between the first and second substrates, wherein the light blocking member includes at least one dam having at least one opening, and wherein the liquid crystal layer contacts the sealing member and a plurality of pixels disposed in the DA.

According to an exemplary embodiment of the present invention, the light blocking member includes a plurality of dams, wherein each dam, from among the plurality of dams, includes a plurality of openings.

According to an exemplary embodiment of the present invention, the plurality of openings of adjacent dams, from among the plurality of dams, are staggered.

According to an exemplary embodiment of the present invention, the at least one dam is formed using a photo resist process.

According to an exemplary embodiment of the present invention, the light blocking member is formed using a full tone mask.

DETAILED DESCRIPTION OF THE EMBODIMENTS

Exemplary embodiments of the present invention will be described in detail with reference to the accompanying drawings. The present invention may, however, be embodied in various different forms and should not be construed as being limited to the exemplary embodiments set forth herein.

In the drawings, the thicknesses of layers, films, panels, regions, and the like, may be exaggerated for clarity. Like reference numerals may refer to like elements throughout the specification and drawings. It will be understood that when an element such as a layer, film, region, or substrate is referred to as being "on" another element or "adjacent" to another element, it may be directly on or adjacent to the other element or intervening elements may also be present.

Figure 1:
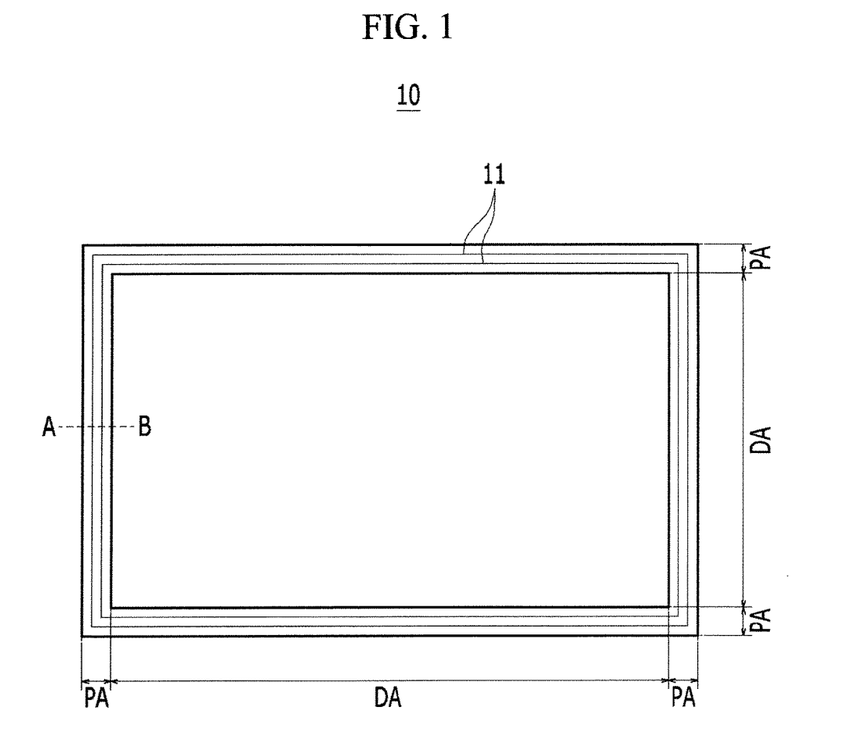
FIG. 1 is a layout view of a liquid crystal display according to an exemplary embodiment of the present invention.

FIG. 1 is a layout view of a liquid crystal display according to an exemplary embodiment of the present invention.

Referring to FIG. 1, a display panel of the liquid crystal display 10 may include a display area (DA) corresponding to an area of the liquid crystal display 10 in which an image may be displayed, and a peripheral area (PA) disposed in a vicinity of the DA.

The DA may include a plurality of signal lines and a plurality of pixels 21 connected to the corresponding plurality of signal lines. The plurality of pixels 21 may be arranged in a matrix form. The signal lines may be disposed on a lower display panel of the liquid crystal display and may include a plurality of gate lines transferring gate signals (e.g., scanning signals) and a plurality of data lines transferring data voltages. The gate lines may extend in a substantially horizontal direction and may be substantially parallel with respect to each other. The data lines may extend in a substantially vertical direction and may be substantially parallel with respect to each other. According to an exemplary embodiment of the present invention, the horizontal direction may correspond to an x direction, and the vertical direction may correspond to a y direction. The y direction may be substantially perpendicular to the x direction.

Each pixel 21 may include a switching element connected to at least one gate line and at least one data line and at least one pixel electrode connected to the switching element. The switching element may include at least one thin film transistor.

In order to implement a color display, each pixel 21 may display one primary color from among the primary colors red (R), blue (B), and green (G), or one primary color from among the primary colors yellow (Y), cyan (C), and magenta (M). This configuration may be referred to as a spatial division. Alternately, each pixel 21 may display the primary colors R, B, G, Y, C, and M over time to allow a desired color to be recognized by spatial and temporal sums of the displayed R, B, G, Y, C, and M primary colors. This configuration may be referred to as a temporal division. However, each pixel 21 may display other colors in addition to the R, B, G, Y, C, and M primary colors. Each pixel 21 may be disposed in a place corresponding to each pixel electrode and may include a color filter 23, 25, or 27. Each color filter, from among the color filters 23, 25, and 27, may represent one primary color.

A plurality of dams 11 may be formed in the PA using a blue photo lithography process. In addition, the plurality of dams 11 may be formed using a photo resist process. The plurality of dams 11 may be formed at an outer side of the DA. For example, the plurality of dams 11 may be formed at a boundary between the DA and the PA.

Figure 2:
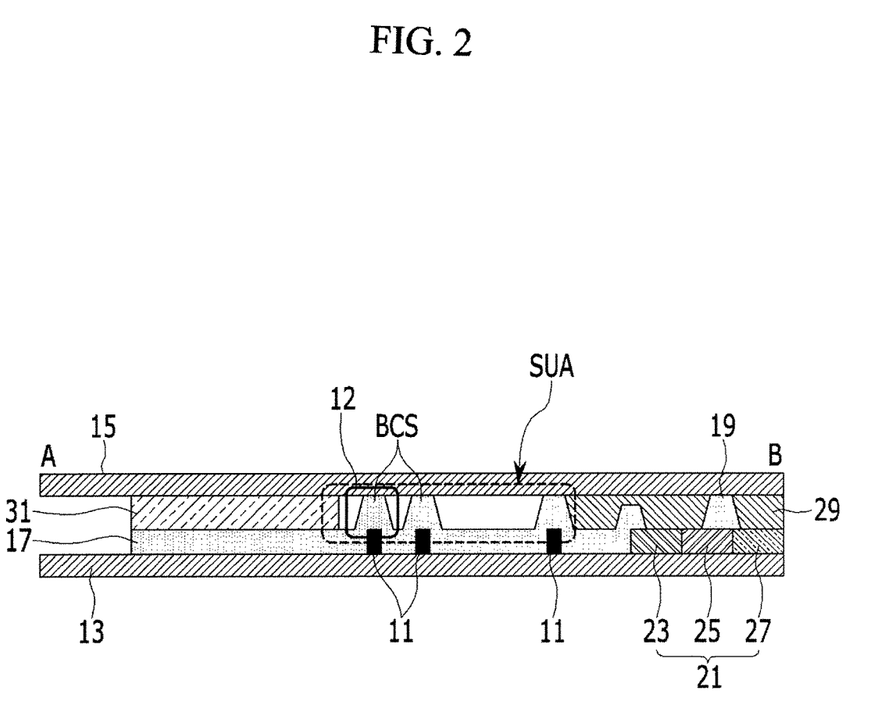
FIG. 2 is a cross-sectional view of the liquid crystal display illustrated in FIG. 1, taken along line A-B.
Figure 3:
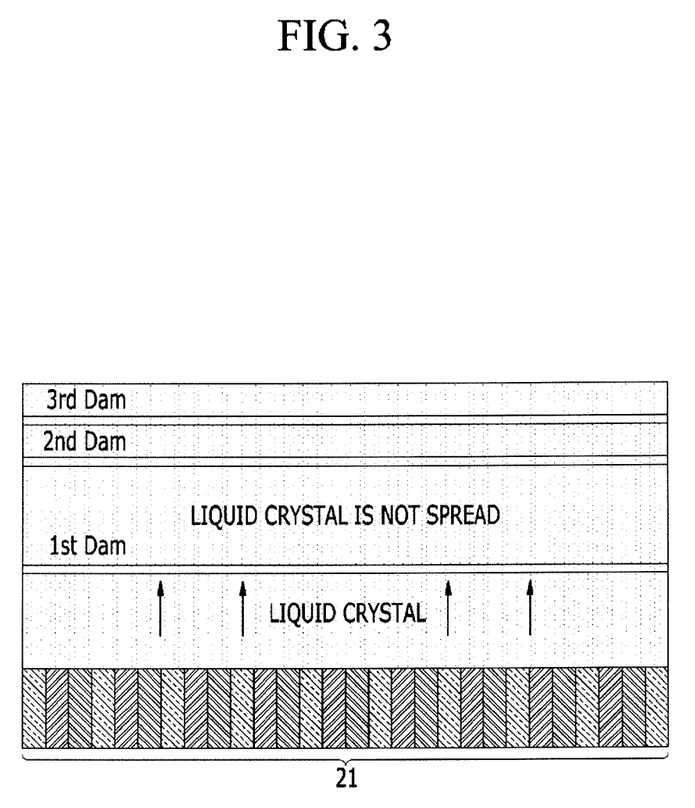
FIG. 3 illustrates a liquid crystal that is not spread to a seal line, according to a comparative example.
Figure 4:
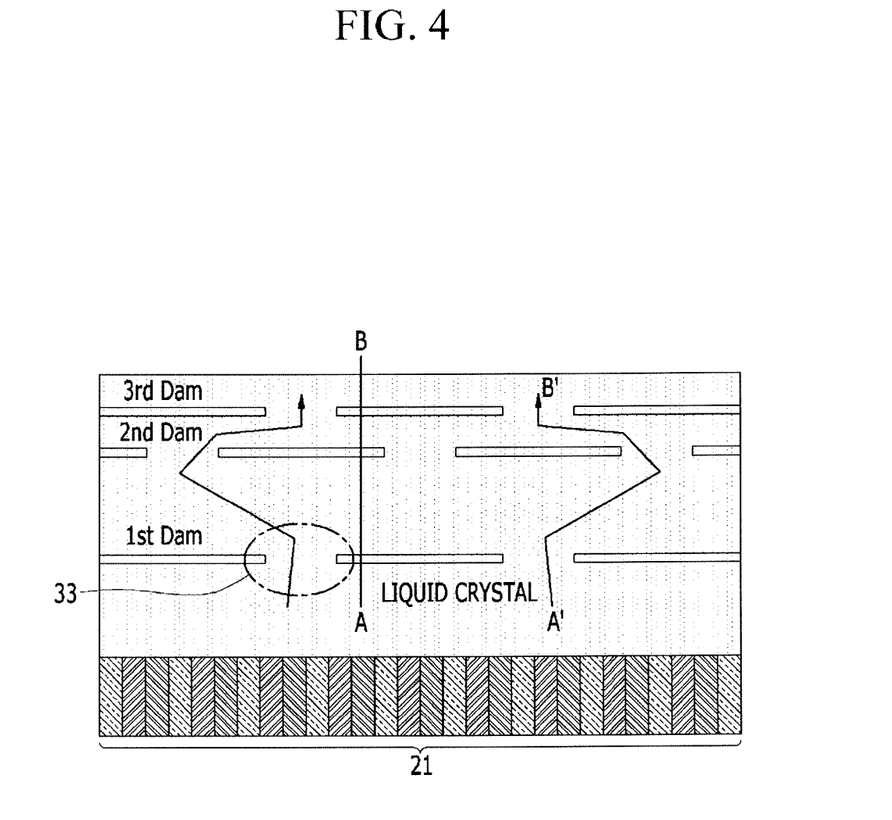
FIG. 4 illustrates a structure in which opening parts of dams are misaligned with respect to each other, according to an exemplary embodiment of the present invention.
Figure 5:
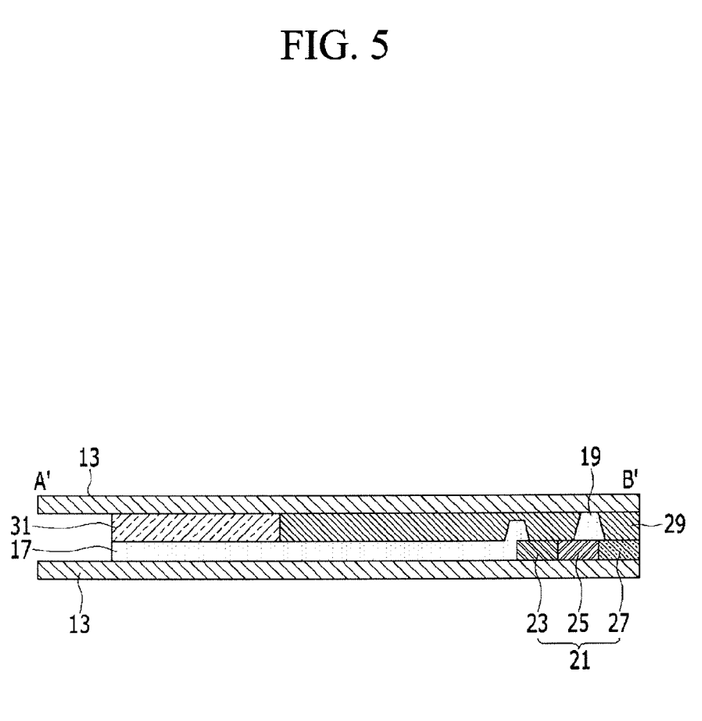
FIG. 5 is a cross-sectional view taken along line A'-B' of FIG. 4, according to an exemplary embodiment of the present invention.

FIG. 2 is a cross-sectional view of the liquid crystal display 10 illustrated in FIG. 1, taken along line A-B. FIG. 3 illustrates a liquid crystal that is not spread to a seal line, according to a comparative example. FIG. 4 illustrates a structure in which opening parts of dams are misaligned with respect to each other, according to an exemplary embodiment of the present invention. FIG. 5 is a cross-sectional view taken along line A'-B' of FIG. 4, according to an exemplary embodiment of the present invention.

Referring to FIG. 2, the liquid crystal display 10 may include a first substrate 13 and a second substrate 15 formed in the PA. The first substrate 13 and the second substrate 15 may face each other (e.g., be opposite to each other).

A light blocking member 17 may be disposed on the first substrate 13. The light blocking member 17 may serve as both a black matrix and a black column spacer (BCS).

The light blocking member 17 may be formed by using a half tone mask. In an exemplary embodiment of the present invention, the light blocking member 17 may be formed using a full tone mask.

The light blocking member 17 may be formed integrally with column spacer parts 19. In addition, the column spacer parts 19 may be disposed on a plurality of pixels 21.

The plurality of pixels 21 may be disposed on the first substrate 13. Each pixel 21, from among the plurality of pixels 21, may include a blue color filter 23, a green color filter 25, or a red color filter 27.

A liquid crystal layer 29 which includes liquid crystals may be disposed between the first substrate 13 and the second substrate 15. A seal 31 may be formed at circumferences (e.g., outer perimeters) of the first substrate 13 and the second substrate 15. The seal 31 may form a closed and curved structure.

The seal 31 may couple and fix the first substrate 13 and the second substrate 15 to each other. The seal 31 may confine the liquid crystal layer 29 between the first and second substrates 13 and 15. The seal 31 may be transparent or opaque. An opaque seal 31 may include a pigment such as black carbon, or the like. The opaque seal 31 may include an opaque material.

The light blocking member 17 may include a plurality of dams 11 formed in the light blocking member 17. According to a comparative example, the dams may continuously enclose four surfaces of the liquid crystal panel 10. A buildup structure 12 may be formed at an outer side portion of the liquid crystal display 10. The buildup structure 12 may be formed by overlapping dams 11 formed using the blue photo lithography process and BCSs. The buildup structure 12 may arrive 2.7 µm to 3.0 µm close to a cell gap. A cell gap may be 3.0 µm. Therefore, in a comparative example, the liquid crystal layer 29 might not be spread to an end of an outer side portion of the liquid crystal display 10 at the time of performing a one drop fill (ODF) procedure. As a result, in a comparative example, seal unoccupied areas (SUAs) may be generated on four surfaces of the outer side portion of the liquid crystal display 10. An SUA may be an area of the liquid crystal panel 10 which does not include a sealant or a liquid crystal.

An upper surface of the light blocking member 17 may reach a higher elevation with respect to the first substrate 13 in portions of the first substrate 13 where the plurality of dams 11 are formed than in portions of the first substrate 13 where the plurality of dams 11 are not formed because the dams 11 have a closed (e.g., uninterrupted) structure to block overflow of a polyimide (PI) alignment film. In a comparative example, due to a high buildup structure 12 formed using a blue photo lithography process (e.g., to form the dams 11) and the BCS of the light blocking member 17, the liquid crystal layer 29 is confined by the buildup structure 12. Liquid crystals of the liquid crystal layer 29 do not pass through the buildup structure 12. Thus, a seal unoccupied area (SUA) in which the liquid crystal layer 29 is not spread, is formed as shown in FIG. 3.

In an exemplary embodiment of the present invention, opening parts are formed in each of the plurality of dams 11, as shown in FIG. 4. The opening parts serve as inlets through which liquid crystals of the liquid crystal layer 29 may be spread. For example, liquid crystals of the liquid crystal layer 29 may flow through the opening parts. In addition, the opening parts may be misaligned with respect to each other between adjacent (e.g., neighboring) dams 11, from among the plurality of dams 11.

Referring to FIG. 5, the light blocking member 17, which includes the plurality of dams 11 having misaligned openings, may have a flat structure in which there is no substantial elevation difference between an upper surface of the light blocking member 17 where a dam 11 is formed (e.g., at an opening part of the dam 11) and an upper surface of the light blocking member 17 where a dam 11 is not formed. According to an exemplary embodiment of the present invention, opening parts formed in a first dam 11 and opening parts formed in a second dam 11 are misaligned with respect to each other, as shown in FIG. 4. In addition, opening parts formed in a third dam 11 and the opening parts formed in the second dam 11 are misaligned with respect to each other.

In an exemplary embodiment of the inventive concept, one or more opening parts of a dam 11 have a structure in which they are opened toward the plurality of pixels 21. The opening facilitates the flow of liquid crystals toward the pixels.

According to an exemplary embodiment of the present invention, with reference to FIG. 5, the liquid crystal molecules of the liquid crystal layer 29 may contact the light blocking member 17 and the seal 31.

While the present invention has been described with reference to exemplary embodiments thereof, it is understood that the present invention is not limited to the disclosed exemplary embodiments. The present invention may cover various modifications and arrangements of the disclosed exemplary embodiments that fall within the spirit and scope of the present invention as defined in the claims.

What is claimed is:

1. A liquid crystal display comprising:
    a display area (DA), in which an image is displayed by a plurality of pixels, and a peripheral area (PA) disposed in a vicinity of the DA;
    a first substrate disposed in the PA and a second substrate facing the first substrate;
    at least one column spacer part disposed on the first substrate;
    a light blocking member disposed on the first substrate;
    a liquid crystal layer disposed between the first substrate and the second substrate; and
    a seal formed at circumferences of the first and second substrates, the seal coupling the first substrate and the second substrate to each other and confining the liquid crystal layer between the first substrate and the second substrate,
    wherein the light blocking member
    includes at least one dam formed therein,
    the at least one dam being positioned in the PA and including at least one opening part formed therein, the at least one opening part serving as an inlet through which liquid crystal of the liquid crystal layer is spread,
    wherein the at least one dam, but not the at least one opening part formed in the at least one dam, is disposed at a first region of a first surface of the first substrate, wherein the at least one opening part formed in the at least one dam is disposed at a second region of the first surface of the first substrate, and wherein a first elevation of the light blocking member, the first elevation of the light blocking member being measured perpendicularly from the first surface to an uppermost part of the light blocking member at the first region, is greater than a second elevation of the light blocking member, the second elevation of the light blocking member being measured perpendicularly from the first surface to an uppermost part of the light blocking member at the second region.

2. The liquid crystal display of claim 1, wherein
the light blocking member and the at least one column spacer part are formed integrally with each other.

3. The liquid crystal display of claim 1, wherein the light blocking member includes a plurality of dams, wherein
each dam, from among the plurality of dams,
includes one or more opening parts formed therein.

4. The liquid crystal display of claim 3, wherein
one or more opening parts formed between neighboring dams, from among the plurality of dams, are misaligned with respect to each other.

5. The liquid crystal display of claim 4, wherein
the one or more opening parts
are opened toward the plurality of pixels.

6. The liquid crystal display of claim 1, wherein
the at least one dam
is formed using a photo resist process.

7. The liquid crystal display of claim 1, wherein
the light blocking member
is formed using a full tone mask.

8. A liquid crystal display, comprising:
a display area (DA) for displaying an image and a peripheral area (PA) disposed in a vicinity of the PA;
a first substrate disposed in the PA, and a second substrate disposed opposite to the first substrate;
a liquid crystal layer formed between the first and second substrates;
a light blocking member disposed on the first substrate;
a column spacer part disposed on the first substrate and formed integrally with the light blocking member; and
a seal formed at outer perimeters of the first and second substrates, the seal fixing the first and second substrates to each other and sealing the liquid crystal layer between the first and second substrates,
wherein the light blocking member includes at least one dam having at least one opening, and
wherein a first upper surface of the light blocking member is formed at a first elevation, with respect to the first substrate, on a first portion of the first substrate corresponding to the at least one dam but not corresponding to the at least one opening of the at least one dam,
wherein a second upper surface of the light blocking member is formed at a second elevation, with respect to the first substrate, on a second portion of the first substrate corresponding to the at least one opening of the at least one dam, and wherein the first elevation is higher than the second elevation.

9. The liquid crystal display of claim 8, wherein the light blocking member includes a plurality of dams, wherein each dam, from among the plurality of dams, includes a plurality of openings.

10. The liquid crystal display of claim 9, wherein a first opening of a first dam, from among the plurality of the dams, is misaligned with respect to a second opening of a second dam, from among the plurality of dams, wherein the first and second dams are adjacent to each other.

11. The liquid crystal display of claim 8, wherein the light blocking member is formed using a half tone mask or a full tone mask.

12. The liquid crystal display of claim 8, wherein the at least one dam is formed using a photo resist process.

13. The liquid crystal display of claim 8, wherein the seal is transparent or opaque.

14. The liquid crystal display of claim 8, wherein the seal includes black carbon.

15. A liquid crystal display, comprising:
a display area (DA) for displaying an image and a peripheral area (PA) disposed in a vicinity of the PA;
a first substrate disposed in the PA, and a second substrate disposed opposite to the first substrate;
a liquid crystal layer formed between the first and second substrates;
a light blocking member disposed on the first substrate and in contact with the first substrate;
a column spacer part disposed on the first substrate and formed integrally with the light blocking member; and
a seal formed at outer perimeters of the first and second substrates, the seal fixing the first and second substrates to each other and sealing the liquid crystal layer between the first and second substrates,
wherein the light blocking member includes at least one dam having at least one opening, and
wherein the liquid crystal layer contacts the sealing member and a plurality of pixels disposed in the DA,
wherein the light blocking member contacts the second substrate at a first region of the at least one dam, the first region of the at least one dam excluding the at least one opening, and the light blocking member does not contact the second substrate at a second region of the at least one dam, the second region of the at least one dam corresponding to the at least one opening.

16. The liquid crystal display of claim 15, wherein the light blocking member includes a plurality of dams, wherein each dam, from among the plurality of dams, includes a plurality of openings.

17. The liquid crystal display of claim 16, wherein the plurality of openings of adjacent dams, from among the plurality of dams, are staggered.

18. The liquid crystal display of claim 15, wherein the at least one dam is formed using a photo resist process.

19. The liquid crystal display of claim 15, wherein the light blocking member is formed using a full tone mask.

* * * * *